Oct. 11, 1949.   S. SHIPLEY   2,484,753
ELECTRIC HEDGE TRIMMER
Filed Aug. 5, 1946
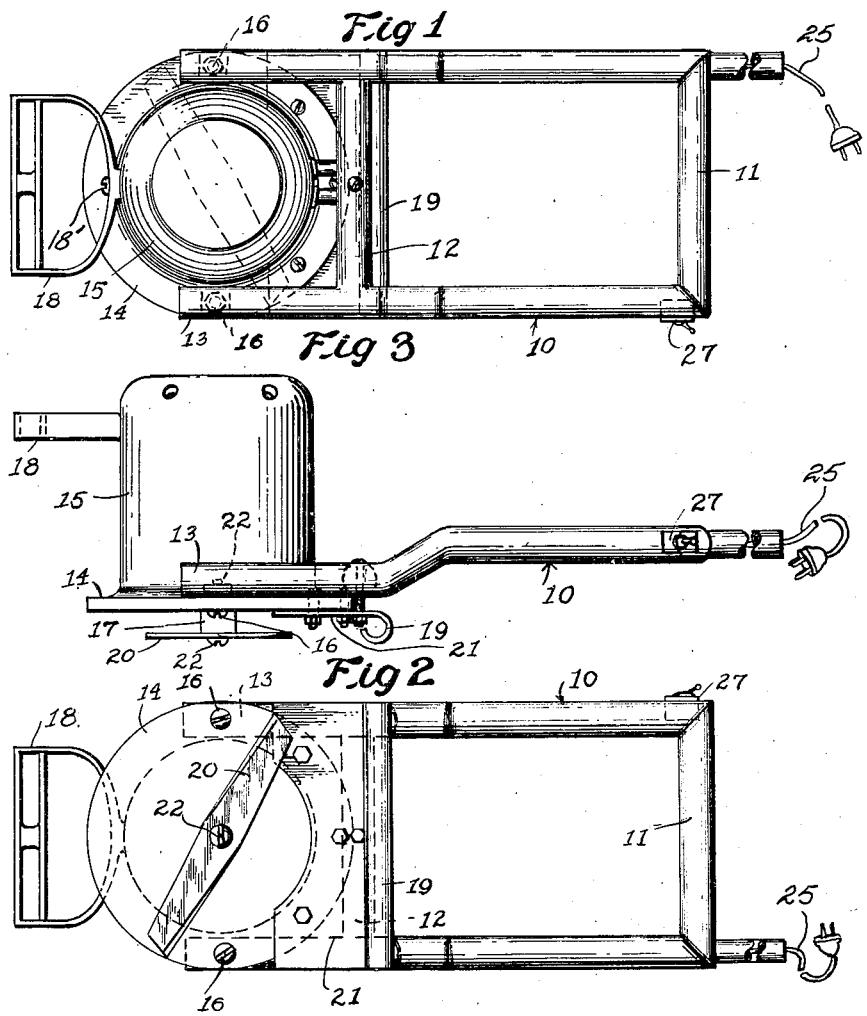
Inventor
Sherman Shipley
By
Attorney

UNITED STATES PATENT OFFICE 2,484,753

ELECTRIC HEDGE TRIMMER

Sherman Shipley, Ada, Okla.

Application August 5, 1946, Serial No. 688,488

4 Claims. (Cl. 30—276)

My invention relates to a machine for cutting and trimming sides and tops of hedges.

This machine has been studied from every angle and with all improvements incorporated it has been in practical use for several months.

The trimmer is shown with a two armed blade as being most practical, although a circle-saw blade may also be used. The former, however, running at higher speed trims into more and smaller pieces than the latter.

My trimmer is quite small, the usual size being about 16½ inches long, 6¾ inches high and 5¼ inches wide, and weighs complete only 5½ pounds and can therefore be manipulated easily by one hand. The handle is so positioned that when trimming the sides of a hedge, the center of gravity holds the trimmer in a true up and down position without straining the operator's hand or wrist.

The trimmer is provided with a shield over the two point cutter blade to protect the operator from flying cuttings, which are almost as fine as sawdust, as a result of the high rate of speed of the blade.

To obtain best results, the trimmer is applied in zigzag motion across the hedge or brush, and with very broad hedges, the same is cut halfway from each side.

On account of the light weight of the trimmer the operator is enabled to use it at arm's length as when trimming evergreens for instance.

A uniform trim is the result of using my trimmer and no channels are left on top of the hedge and the work is done many times faster than with ordinary hand shears.

On account of its simple construction, the cost of manufacture is very low.

In the accompanying drawing, one embodiment of my invention is illustrated and like reference numerals refer to the same details in the different views.

Figure 1 is a top plan view of my trimmer;

Figure 2 is a bottom plan view thereof;

Figure 3 is a side elevation of Figure 1.

The trimmer comprises a U-shaped frame 10 of tubular light material, preferably an aluminum alloy, with cross braces 11 and 12 at its rear end and near its middle. The frame 10 continues forwardly with two shanks 13 bent downwardly for balance and to the ends of which is secured by bolts 16, the bottom flange 14 of an upright housing for the motor 15. The arms 13 are bolted flat on the flange 14.

At the forward end of the trimmer the cylinder 15 is provided a bracket 18 made of metal bands and held in position by a screw 18' or the like. This bracket 18 provides a forward handle, when trimming the top of a hedge. When used for vertical cutting, the trimmer will hang with its frame and blade perfectly vertical convenient to the operator, because of the fact that the parts are so proportioned and arranged, particularly by the downward bend of the arms 13, that the center of gravity of the trimmer acts in the length direction of the frame or handles 10.

On the under side of the flange 14 is secured a shield 21, preferably provided with a curled edge 19 for combining lightness with strength and to protect the operator from flying cuttings. Spaced below the housing flange 14 is revolvably mounted the thin, narrow two pointed cutting blade 20 with a hub 17 held in position by a screw 22 carried by the bottom of the housing 15. The curled edge 19 is positioned slightly below and some distance behind the blade 20.

From an outside source of electric current, a double conductor cable 25 supplies motive force for operating the motor and rapidly rotating the blade 20. This cable enters from the rear end of the tubular frame 10, passing through one of the side arms 13 into the forward, hollow cross brace 12 where it divides to supply current to the two poles (not shown) of the motor 15, a switch 27 being provided for the cable.

It is to be understood that the invention as herein disclosed may be varied from the details described and shown without departure from the spirit of the subjoined claims.

I claim:

1. A trimmer machine of the character stated, comprising a relatively long rectangular frame having spaced paralllel side rails, a transverse end rail connecting the side rails at one end of the frame, a transverse intermediate rail connecting the side rails of the frame adjacent to the other end thereof, said side rails having portions freely extended beyond the intermediate rail, an electric motor mounted upon the free end portions of the side rails with its longitudinal axis perpendicular to said side rails, a rotary cutting blade operatively connected with the motor to turn on the longitudinal axis thereof in a plane spaced from but parallel with the frame, the said end rail of the frame providing a handle, and a handle secured to the motor at the end thereof remote from the cutting blades.

2. A trimming machine of the character stated comprising a relatively long rectangular frame having spaced parallel side rails, a transverse end rail connecting the side rails at one end of the frame, a transverse intermediate rail connecting the side rails adjacent to but inwardly from the other end of the frame whereby the side rails have free end portions extending beyond the intermediate rail, an electric motor unit having an encircling flange at one end, the motor unit being disposed between the free end portion of the side rails and said flange being secured to the free end portions of the side rails and to the intermediate rail, the long axis of the motor being perpendicular to the side rails, whereby when the machine frame is horizontally disposed the motor unit will extend a substantial distance above the plane of the frame, a hub connected with the motor and extending from the flanged end thereof, a cutter blade rotatably secured to the hub to rotate in a plane paralleling the plane of the frame, adjacent to the underside of the frame, said transverse end rail forming a handle, and a handle secured to the motor unit at the upper end thereof remote from the flanged end.

3. A trimming machine of the character stated in claim 2, wherein the said free end portions of the side rails are in offset planes with respect to the portions connected with the transverse end rail whereby substantially a half of the length of the frame is in a plane parallel to but offset from the other half of the length of the frame.

4. A trimming machine of the character stated in claim 2, with a guard secured to the motor flange upon the side of the motor adjacent to the intermediate rail, the guard having a portion extending transversely of the frame and intersecting the plane of rotation of the cutter blades.

SHERMAN SHIPLEY.

REFERENCES CITED

The following references are of record in the file of this patent:

UNITED STATES PATENTS

| Number | Name | Date |
|---|---|---|
| 1,937,586 | Ortt | Dec. 5, 1933 |
| 2,091,827 | Mercatoris | Aug. 31, 1937 |
| 2,242,524 | Hunt | May 20, 1941 |